United States Patent [19]

Healy et al.

[11] Patent Number: 5,644,736

[45] Date of Patent: Jul. 1, 1997

[54] SYSTEM AND METHOD FOR SELECTING COMPONENTS OF A HIERARCHICAL FILE STRUCTURE

[75] Inventors: Vivian Louise Healy, San Jose; Hanhsi Huang, Cupertino; Tin Luong Nguyen, San Jose, all of Calif.

[73] Assignee: International Business Machines Corporation, Armonk, N.Y.

[21] Appl. No.: 449,979

[22] Filed: May 25, 1995

[51] Int. Cl.$^6$ ..................................................... G06F 3/00
[52] U.S. Cl. ........................................... 395/341; 395/357
[58] Field of Search ............................... 395/155–161, 395/600

[56] References Cited

U.S. PATENT DOCUMENTS

| | | | |
|---|---|---|---|
| 4,825,354 | 4/1989 | Agrawal et al. | 364/200 |
| 4,945,475 | 7/1990 | Bruffey et al. | 364/200 |
| 5,008,820 | 4/1991 | Christopher, Jr. et al. | 364/200 |
| 5,093,779 | 3/1992 | Sakurai | 395/600 |
| 5,095,423 | 3/1992 | Gramlich et al. | 395/600 |
| 5,187,786 | 2/1993 | Densmore et al. | 395/600 |
| 5,218,696 | 6/1993 | Band et al. | 395/600 |
| 5,226,163 | 7/1993 | Karsh et al. | 395/700 |
| 5,247,658 | 9/1993 | Barrett et al. | 395/600 |
| 5,313,646 | 5/1994 | Hendricks et al. | 395/600 |
| 5,355,497 | 10/1994 | Cohen-Levy | 395/700 |
| 5,361,349 | 11/1994 | Bugeta et al. | 395/600 |
| 5,367,671 | 11/1994 | Feigenbaum et al. | 395/600 |
| 5,379,422 | 1/1995 | Antoshenkov | 395/600 |
| 5,423,034 | 6/1995 | Cohen-Levy et al. | 395/600 |

OTHER PUBLICATIONS

Stokell, I., "Renew of: Microsoft Windows 3.1," Newsbytes Aug. 1992.

Rose, P., "Xtree Manages Best," Computer Reseller News, Mar. 1991, p. 57.

"Mastering Windows 3.1", Sybex, 1992, pp. 105–126.

*Primary Examiner*—Raymond J. Bayerl
*Assistant Examiner*—A. Katbab
*Attorney, Agent, or Firm*—Baker, Maxham, Jester & Meador

[57] ABSTRACT

Graphical user interface (GUI) logic for enabling the selection and displaying of specific directories, subdirectories, and files. The GUI logic displays on the screen the selection and deselection options that are available. The entire hierarchical tree structure of the file system can be selected for a particular operation or any leaf or node of the tree may be selected. The logic automatically traverses the tree in response to a user's selection of a displayed object on the screen. Since the selection mode of the input device, such as a mouse, is displayed on the screen it is readily apparent to the user.

38 Claims, 15 Drawing Sheets

SYSTEM AND METHOD FOR SELECTING COMPONENTS OF A HIERARCHICAL FILE STRUCTURE

BACKGROUND OF THE INVENTION

1. Field of the Invention

This invention relates generally to management of files stored on a computer, and in particular, to a graphical user interface for file viewing and selecting.

2. Description of the Related Art

Information in a computer system is typically stored in the form of signals on various storage mediums, such as magnetic tapes, disks, semi-conductor devices, etc. As storage densities increase with advances in storage device technology, it has become possible for devices to store much more information than previously. When information is stored on a device, it is cataloged so that the same information is later retrieved when desired. Normally, a user identifies unique code name for a particular body of data to differentiate it from others. To retrieve a desired body of data, an appropriate code name associated with that data is used, wherein the device searches for an address of data associated with that code name and retrieves the desired data when that address is located.

Typically, a body of data is termed as a "file" and the cataloging of these files in the device is termed "filing". Typically, code names associated with particular data contain address pointers which point to areas in memory reserved for mass storage. The various code names and their pointers comprise the cataloging system. When high density storage devices are used, millions of bits of information are capable of being stored in such a device, which permits thousands, or even millions of files to be created.

Files are stored on a mass storage device such as a disk in a cluster or clusters or sectors, each cluster having a predetermined number of sectors. Each cluster has a unique different starting address. The locations of files are kept track of by means of some type of indexing system, such as the well-known file allocation (FAT) which itself is stored on the disk. Each position of the FAT is associated with a different cluster and contains an entry indicating there are no other clusters associated with the file or pointing to the next cluster of the file.

Files are located through the use of a hierarchical file structure. One well-known type of hierarchical file structure is organized as a tree. In a tree structured file system, files are organized with a single root node referred to as the "root." One or more nodes may then be connected to the root and one or more nodes may be connected to each node. Each node which has another node connected to it is a "directory" of flies. A leaf node is a node which has no other node connected to it except for the one immediately above it. Leaf nodes may be subdirectories or files. Technically, any node below the root node or root directory is a subdirectory. However, it has become common practice to refer to the first subdirectory mentioned in an identified path as a directory and any others following it as subdirectories of that so-called directory. That practice will be followed in this specification.

Each disk typically contains a root directory, many subdirectories and a multiplicity of files. A given file may be at the end of a path passing through the root directory and several subdirectories. Each directory contains entries for additional directories and files. A specific file may be identified by specifying the drive, path and file name. For example, "C:/Dir1/Dir2/FILE" identifies a file name FILE that is listed in subdirectory Dir2, which is subdirectory of Dir1, which in turn is a subdirectory of root directory C. This example is accurate for a DOS based operating system. In a UNIX type of operating system, the root directory is typically noted with a "/" followed by the file system name. In order to identify a particular file upon which an operation needs to be performed that file must somehow be marked to indicate that it is the intended file for the operation. The earliest file systems had text-based interfaces requiring that the entire file name be typed out with its entire path identifying the root directory and every subdirectory located in between the file and the root directory. It can be appreciated that such a requirement can be extremely cumbersome in the case of several hundred subdirectories or more. It can be further appreciated that this onerous task has an inherent risk of typographical errors that increases in severity if many files need to be marked.

An improvement in techniques available for marking files for an internal operation was made available by the introduction of operating systems which provided a graphical user interface (GUI). A GUI is fundamentally a protocol by which an application can generate output on a computer that has a bit-mapped display and can receive input from devices associated with the display. Essentially the improvement is that data objects representing particular files can be shown on the screen so the requirement for typing the path is eliminated. Through an application programming interface (API) different applications can interact with the interface and the underlying operating system. One popular operating system is the UNIX operating system which was originally developed by Bell Labs. Many versions of the UNIX operating system are provided by various computer companies. For example, the IBM Corporation provides an operating system known as AIX which is readily familiar to those with a background in UNIX programming. One GUI that is available to work with AIX is OSF/Motif which is based on the X-window system, often abbreviated as X. OSF/Motif is available from the Open Software Foundation, Inc. (OSF). The X-window system was developed by the Massachusetts Institute of Technology.

OSF/Motif is the means by which an application program can obtain input from and display output to a user of the application. Motif provides the intermediary mechanisms for communication between the application and the user. To both sides, these mechanisms appear as a set of objects with graphical representations on the screens. The program creates and displays objects of a variety of types provided by Motif for showing the user particular kinds of output and requesting particular kinds of input. The user supplies input by manipulating the screen representations as objects with a pointer, a keyboard, or both as described above. The Motif API is supplied by OSF and is implemented in the "C" programming language. Motif requires that an application written in C conform to the American National Standards Institute (ANSI). For this reason, it is convenient to explain the logic implemented by this invention in terms of the C language conforming to ANSI standards; however, it will be apparent to those skilled in the art that other programming languages as well as well-known hardware logic can be substituted in view of the teachings described below. For a comprehensive overview and description of how to program to communicate with the OSF/Motif API, reference may be made to the *OSF/Motif Programmer's Guide*, Release 1.2, provided by the Open Software Foundation, Inc.

The X-window system upon which Motif is based is architectured along the client-server computing model. The application program is the client, communicating through the X protocol with a server that handles the direct output to an input from the display. The client and server may be running on the same machine or on different machines, communicating over a network. Applications do not communicate with the X server directly. Instead they use one or more libraries that provide high-level interfaces to the X protocol. The three principal libraries available to a Motif application are X lib, the X tool kit intrinsics (Xt), and Motif tool kit. Three of the most important Xt contributions are the following: objects, known as widgets, used to hold data and present an interface to the user; management of widget geometry; and dispatching and handling of events.

A widget is a combination of state and procedure. Each instance of a widget is a member of a class. A widget class holds a set of procedures and data structures that are is common to all widgets of that class. A widget instance contains the procedures and data structures that are particular to that single widget. A widget instance also has a pointer to its class. Each widget class typically provides a general behavior associated with a particular kind of interaction with the user. For example, Motif has a widget class designed to let the user enter and edit text. This class provides a general behavior to support test input and display, including editing, selection, cutting and pasting of text. The class has data structures related not only to the context of the text but also to the appearance of the widgets when displayed as object metaphors. To use this class, an application creates an instance of this class of widget and provides some of its own data and procedures for the widget instance.

Through the use of a GUI, such as that available in IBM's operating system/2 (OS/2) or IBM's AIX operating system, a file can be marked for operation by "selecting" it. Selecting a file involves using a well-known mouse or keyboard to mark a graphical or iconic representation of the file on a computer display screen. While this is an improvement over text-based interfaces, modern computer systems include thousands and potentially millions of files so that selecting each file can be extremely tedious. When a directory contains many files, such as 500 or 1,000, it is very tedious and time-consuming to select files by clicking and dragging the cursor to the intended file. And, if a directory has a lot of subdirectories, the user has to click on each subdirectory in order to select all the files in that subdirectory. Further, while a well-known mouse may provide the most convenient tool for selecting files, a typical user does not know how to view or select files using a mouse because it is not intuitively obvious. This runs counter to the objectives of GUI systems which are intended to improve user performance by making as many things as possible intuitively obvious to him or her. For example, if a left mouse button displays files and a right button selects files, it is not obvious to the user which mouse buttons should be used to display and select files.

It would be an advancement in the art to provide a system and method for defining a user input device such as a mouse to directionally select all files in a directory tree for a particular file system which is displayed on a graphical user interface. It would be a further advancement in the art if it was possible to program such an input device to display files only, or select all files in the currently selected directory, or select all files in all subdirectories, or select all files in the current directory and all subdirectories. Such performance and convenience capability provided in an intuitive graphical user interface would clearly satisfy a long-felt need in the art.

SUMMARY OF THE INVENTION

In accordance with the objectives of this invention as described above and to overcome the limitations of the prior art, a system and method for displaying and selecting directories, subdirectories and files in a graphical user interface is provided. Broadly speaking, the entire hierarchical tree structure on a disk may be selectively displayed on a computer display screen. The system includes logic that automatically internally traverses the directory tree recursively to select or deselect files in response to a user's action through an input device, such as a mouse or keyboard. In a provided "directory tree view" a user can select two options: (1) "A directory"; and (2) "All subdirectories", wherein the first option allows a user to select all files within a directory, and the second option allows the user to select all files within subdirectories located below the indicated directory. Additionally, the user may deselect all files within a directory by repeating the operation, i.e. clicking on the same directory name. Since the "All Subdirectories" option allows the user to select all files in all subdirectories, the user can also deselect all files and all subdirectories by repeating the operation, that is, clicking on the same directory name. The system enables selection of both options simultaneously and the combination of the functionality of both options.

It will be appreciated, in view of the detailed description in conjunction with the drawing described below, that this invention provides an advancement over the prior art because it allows a user to select all files within a directory and all subdirectories within one or two clicks of a mouse. Prior art systems only allow the user to select all files within a single directory. Another unique feature of this invention is that once all the files in the directory are selected the user can deselect individual files. Prior art systems, for example, allow a user to either select all or deselect all. Additionally, the selection mode of the mouse is apparent to the user because it is displayed on the graphical user interface and is therefore intuitive to him or her to know how to select the files in a directory or subdirectory.

BRIEF DESCRIPTION OF THE DRAWING

Other objects and advantages of this invention will become apparent upon reading the following detailed description and upon reference to the drawing in which.

DETAILED DESCRIPTION OF THE PREFERRED EMBODIMENTS

This invention is described in a preferred embodiment in the following drawing figures. In these figures, a like number shown in various figures represent the same or similar elements. While this invention is described in terms of the best mode for achieving this invention's objectives, it will be appreciated by those skilled in the art that variations may be accomplished in view of these teachings without deviating from the spirit or scope of the invention. In particular, certain aspects of this invention are described as operating in terms of computer software in computer memory, but this invention could also be enabled as hardware by one skilled in the computer arts in view of the teachings herein.

System Architecture

Figure 1:
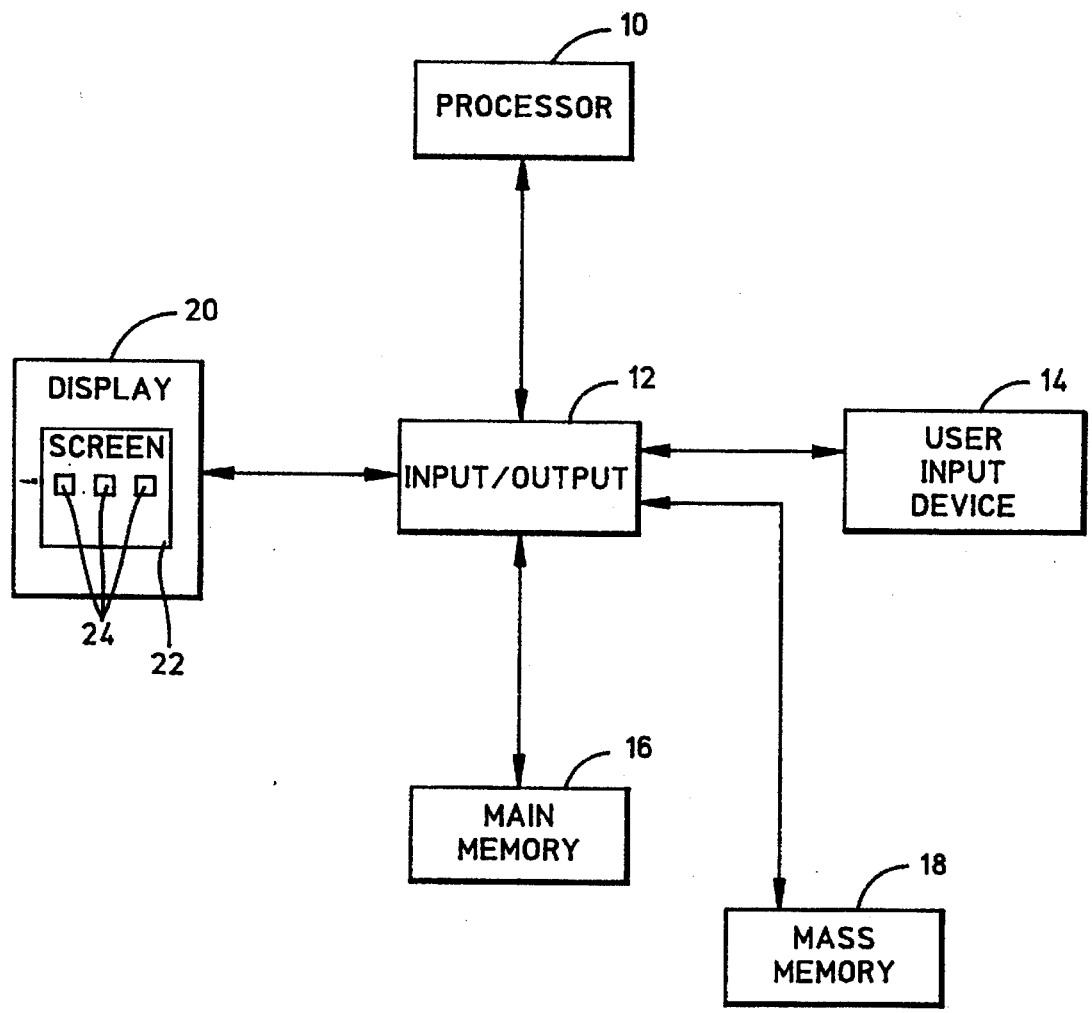
FIG. 1 is a block diagram of a data processing system employing the present invention.

FIG. 1 shows a preferred environment for the operation of this invention. Processor 10 is the central control unit of the hardware as well as the main engine for running software, including the logic of the present invention. The processor is in communication with input/output circuitry 12 to enable communications with various peripherals for enabling this invention. Main memory 16, which may be well-known random access memory or read only memory, loads software that enables this invention. The software (not shown in FIG. 1) is typically loaded from mass memory unit 18, which may be a well-known direct access storage device, such as a hard disk. Communications between main memory 16 and mass memory 18 is achieved through input/output circuitry 12.

Figure 2:
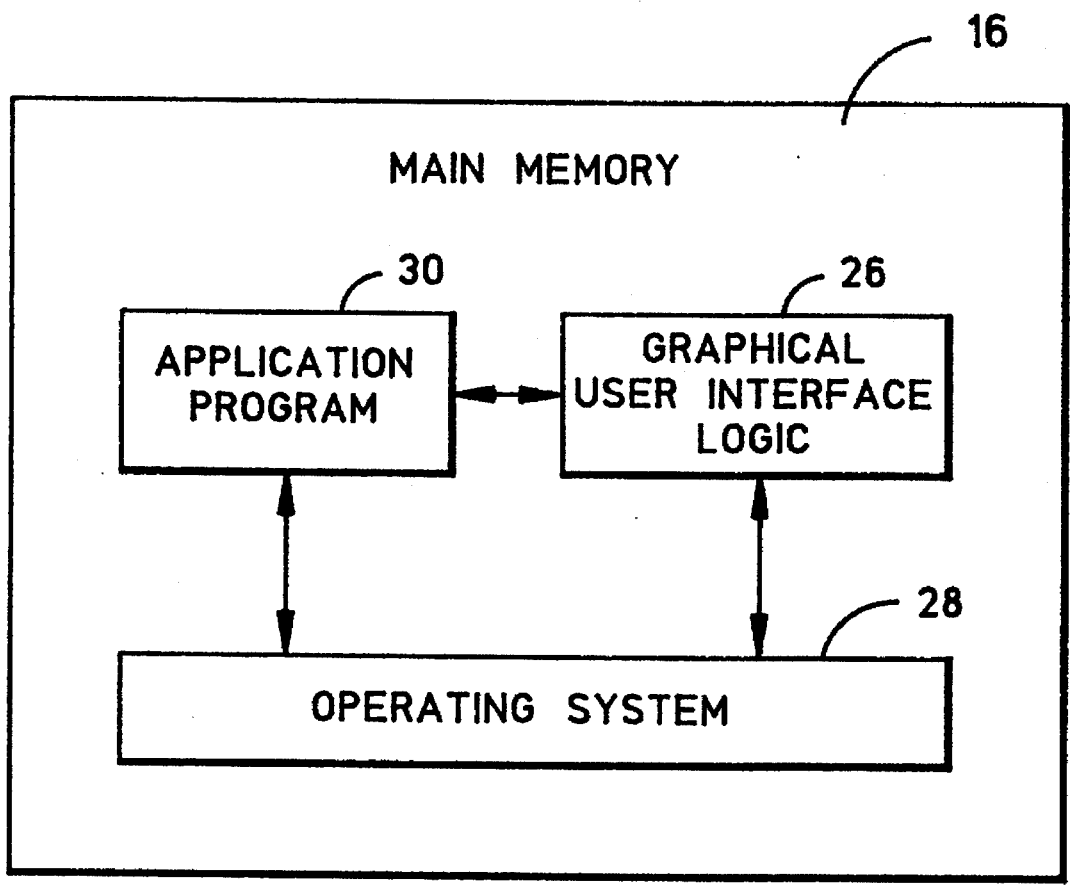
FIG. 2 is a schematic diagram of the architectural relationship of the logic of this invention to software loaded in the main memory of the data processing system of FIG. 1.

In keeping with the objectives of this invention, logic embodied as a computer program, shown in FIG. 2, operates under control of an operating system 28 in the computer architectural environment shown in FIG. 1. Graphical user interface (GUI) logic 26 interfaces directly with operating system 28 in main memory 16 through input/output circuitry 12 to control output displayed on screen 22 of display 20. Access to the display is regulated by processor 10, as is well known in the art. The processor may be, for example, a reduced instruction set computer (RISC), such as the IBM RISC Processor. Operating system 28 is preferably a UNIX-type operating system such as IBM's AIX, version 3.2, 3.25, or 4.1. For the sake of completeness, in order to represent a typical environment in which the invention shall operate, an application program 30 is shown in communication with operating system 28. Such an application program can communicate with GUI logic 26 to display graphical objects 24 on screen 22. The user may manipulate displayed objects 24 through a user input device 14, such as a well-known mouse or keyboard. In a preferred embodiment of this invention, the GUI logic is the means by which an application program can obtain input from and display output to a user of the application.

In a preferred embodiment the operating system includes a layer which contains some graphical user interface logic of its own. Such a layer could include, for example, the well-known operating systems foundation Motif application program interface (API). The Motif API is supplied by the Open Software Foundation, Inc. Motif, for example, provides the intermediary mechanisms for communications between the application and the user. To both sides, these mechanisms appear as a set of objects of graphical representations on the screen, such as objects 24. Application program 30 creates and displays objects of a variety of types, provided by Motif and GUI logic 26, for showing the user particular kinds of output and requesting particular kinds of input. The user supplies input by manipulating the screen representations of these objects on screen 22 with the user input device 14. Through such a protocol as Motif, application program 30 can generate output on display 20 through the technique of bit mapping and then receive input from devices, such as device 14, associated with the display through input/output circuitry 12. GUI logic 26 provides the user with a tool for manipulating objects 24 in accordance with the objectives of this invention. Because the Motif API requires application programs be written in the "C" or "C++" language, examples for implementing the GUI logic 26 are shown in the "C" language; however, it will be appreciated by those skilled in the art that other languages known and presently unknown can be implemented in view of the flow diagrams and graphical representations shown in the drawing figures below. It will be further appreciated that the GUI logic may also be embodied as hardware logic circuitry.

User objects are displayed on the screen 22 by logic 26, such as those shown in examples described below with reference to FIGS. 5–7. GUI logic 26, by using tools of the operating system's protocol, such as the known Motif API for UNIX-type operating systems, creates data objects representing user options, files, directories, and subdirectories on display screen 22. Thus, in the use of Motif, for example, data objects for creating the graphical user interface panel can be created by defining and then calling a widget class. The general techniques for creating data objects are known and reference may be made to the above-mentioned *OSF/MotifProgrammer's Guide* for specific detail on creating objects and widget classes, including examples thereof.

File System

Figure 3:
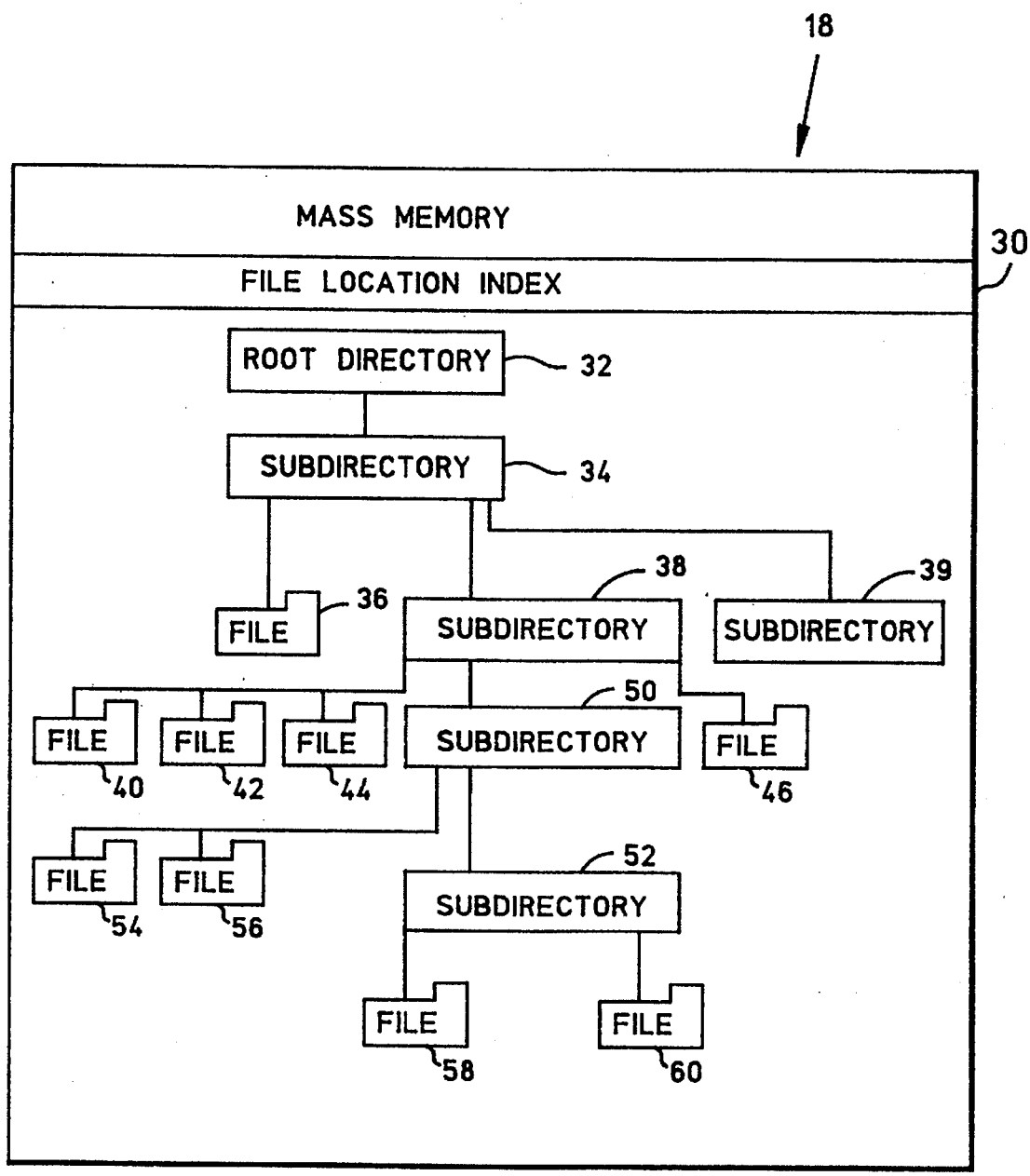
FIG. 3 is a schematic representation of a hierarchical tree structure of information stored in the mass memory of the data processing system of FIG. 1.

Referring to FIG. 3, mass memory 18, which may be a magnetic disk, contains a file location index 30, which may be a file allocation table for identifying the location of the various directories, subdirectories and files located thereon. The following hierarchical tree structure is described in exemplary fashion, and it will be appreciated that this invention is applicable to any data processing system employing a hierarchical tree structure, i.e. composed of a root, nodes, and leaves, all connected in some logical way. Root directory 32 is at the top of the hierarchical structure. Located below root directory 32 is subdirectory 34 having a leaf node file 36. Subdirectory 38 is a non-leaf node of subdirectory 34. Subdirectory 38 contains the following files, 40, 42, 44 and 46. Located immediately below subdirectory 38 is subdirectory 50 which contains leaf nodes, files 54 and 56. Subdirectory 50 also contains non-leaf node 52 which is a subdirectory. Subdirectory 52 contains files 58 and 60. Thus, file 60 is identified by its entire path or "file system name/subdirectory 34/subdirectory 38/subdirectory 50/subdirectory 52/file 60."

Logic Modules

Figure 4:
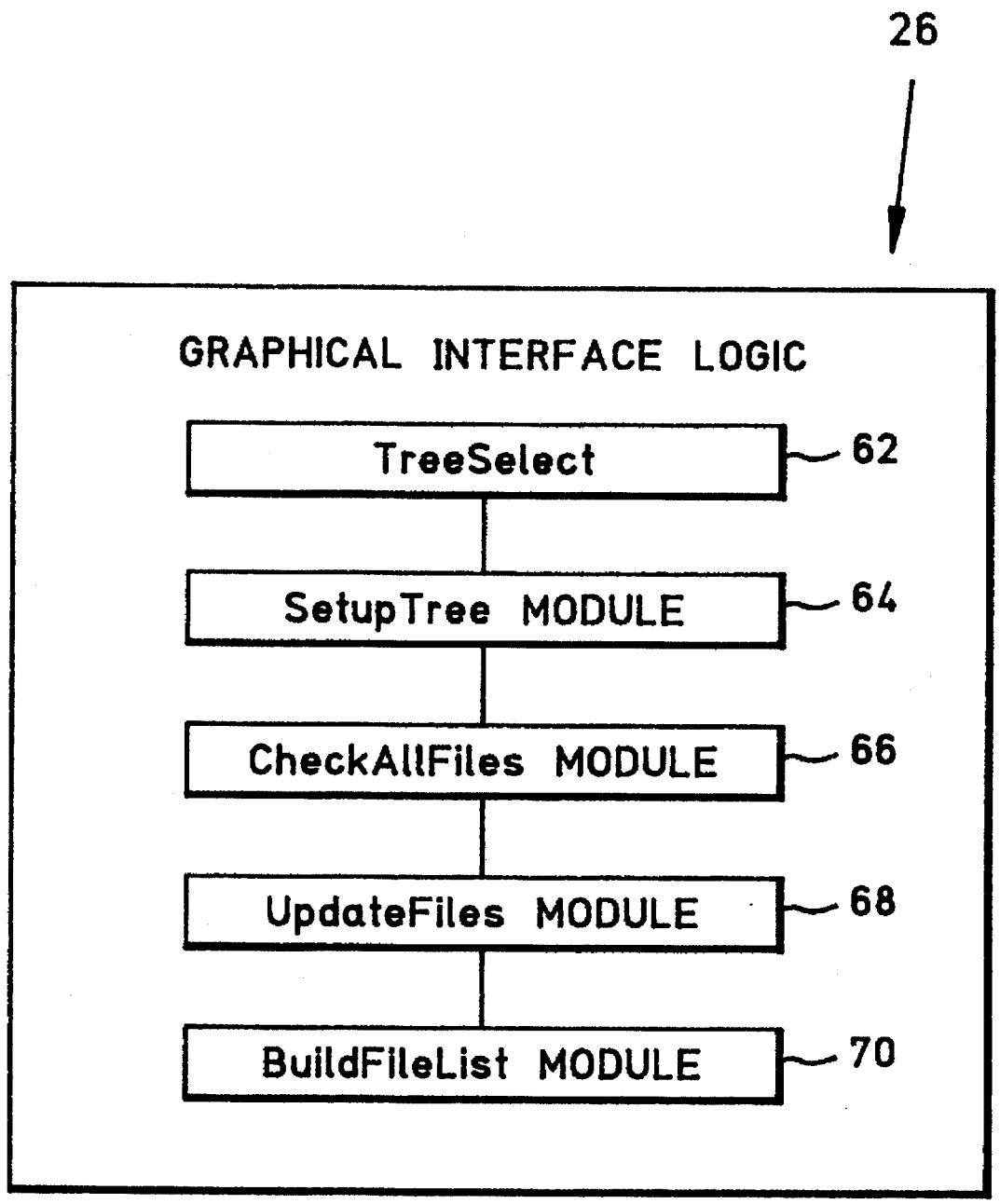
FIG. 4 is a schematic representation of the various modules of the logic of this invention shown in FIG. 2.

FIG. 4 shows a schematic of the graphical interface logic 26 of this invention. The graphical interface logic is comprised of various logic modules. Generally speaking, a TreeSelect module 62 enables the user to select a particular directory within a tree upon which a file or files of interest are located. A SetupTree module 64 enables the user to process all files in a currently selected directory within a currently selected tree. A CheckAllFiles module 66 enables the user to process each child directory (subdirectory) and update each file within that directory until no directories remain in the selected path. UpdateFiles module 68 generally marks files as selected or unselected in a directory. A BuildFileList module 70 builds a list of files and sends this information to the user display panel. Each of these modules will be described in further detail which description of the preferred embodiment of graphical interface logic 26 is described below.

Exemplary Illustration

Figure 5:
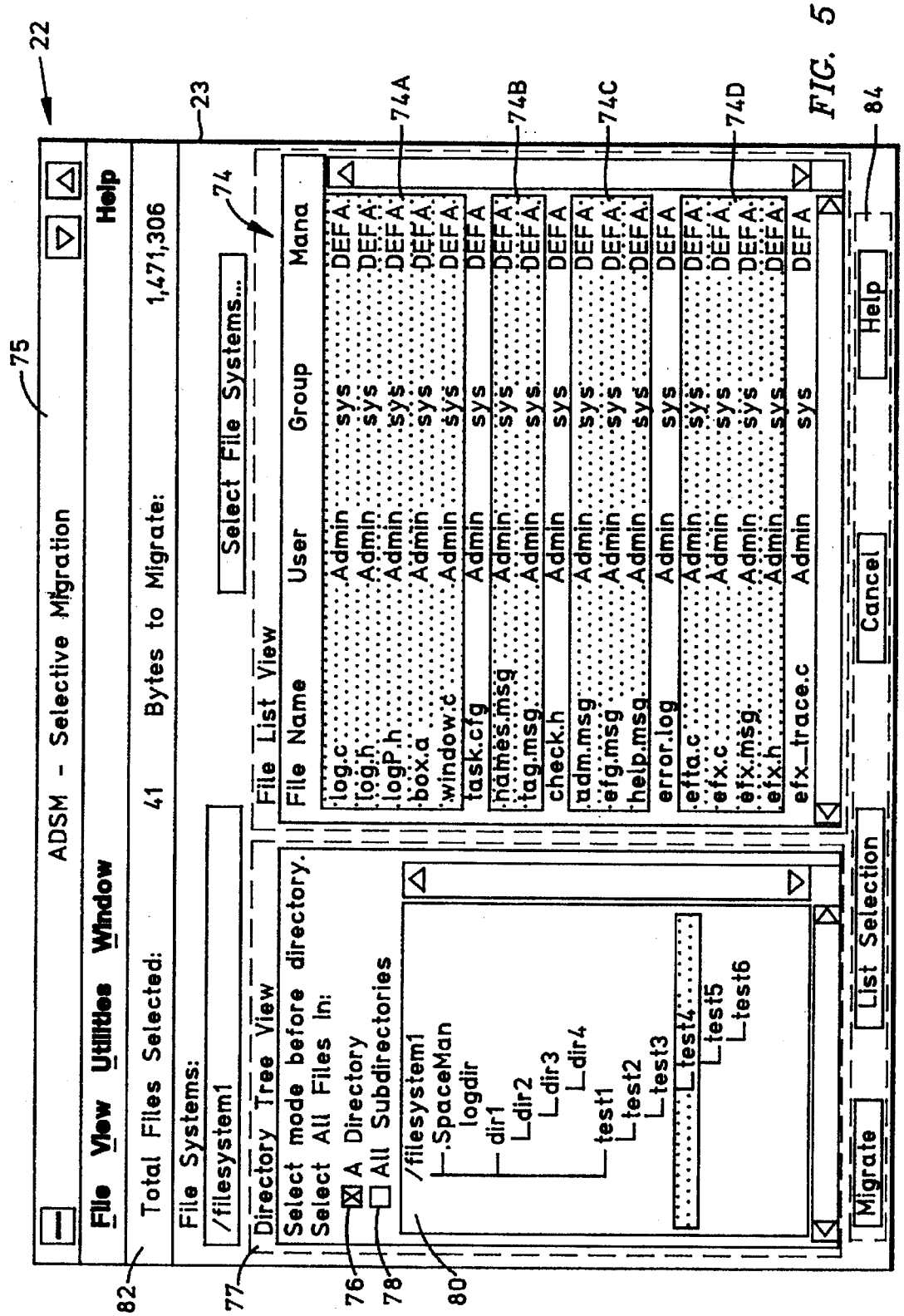
FIGS. 5, 6 and 7 are examples of display panels produced by the logic of this invention on screen 22 of display 20 of the data processing system of FIG. 1.

FIG. 5 shows an example panel 23 produced by logic 26 in conjunction with the system shown in FIG. 1 of this invention. Panel 23 is graphically represented in a well-known window-type fashion on screen 22. An example title panel bar 75 entitled "Selective Migration" is shown to illustrate that the following invention is particularly useful for selecting directories, subdirectories and files for backup operations or moving to another location (a.k.a. migration). An information bar 82 describes how many files have been selected by the operation option selected by the user by selecting box 76 or 78 within Directory Tree View sub-panel 77. The user is advised in sub-panel 77 that before selecting a particular directory from sub-panel 80 to perform an operation upon, he should first select either option 76, "A Directory", or option 78, "All Subdirectories", or alternatively not indicate either option. In the illustrated example panel in FIG. 5, the user has selected option 76, "A Directory." Once this mode is selected the user may select a corresponding directory or subdirectory (in this case "A Directory") within information sub-panel 80.

In the illustrated example of FIG. 5, the "A Directory" option has been selected and the "test4" directory has also been selected. This indicates that the user wants to have all the files located in the directory displayed and selected. Regarding terminology, in keeping with common practice in the art, "test4" may be referred to either independently as a directory having its own subdirectories ("test5" and "test6") or as a subdirectory of the parent "test3". In this example, it is referred to independent of its parent. The files selected within the "test4" subdirectory are shown in information sub-panel 74 that is entitled "File List View". Within this sub-panel the "file name", "user", "group", and other columns are defined. All the files shown in shaded sub-boxes 74A–74D have been automatically selected. Files not selected include "task.cfg", "check.h", "error.log", and "efx_trace.c". The above four mentioned files have not been selected because the system has automatically determined that they are not eligible for selection. Eligibility criteria for selection is dependent upon criteria identified before making the system available to the user. However, eligibility criteria can include example characteristics such as file type and file size. Thus, in this example, it can be seen that the user is provided with an extremely convenient way for selecting all the files within a particular subdirectory without having to identify each file on which he desires to perform a particular operation, such as migration. Further the user may deselect any particular file selected by the operation in sub-panel 74. For the sake of completeness, an operation option bar 84 is preferably provided to give the user easy access to particular operations which he may desire to have performed.

Figure 6:
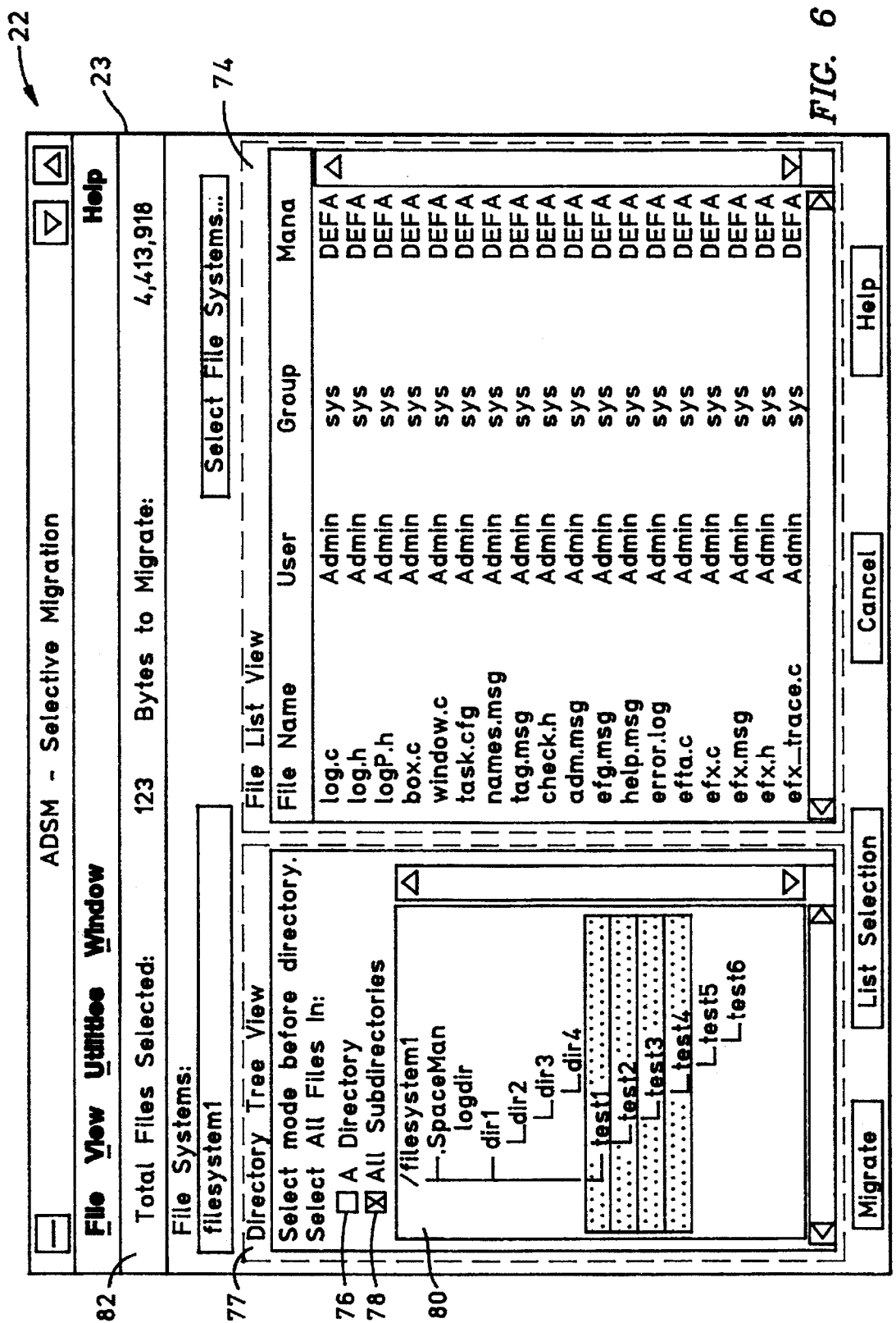

FIG. 6 shows example panel 23, which has been described above with reference to FIG. 5, in which the user has selected the option of "All Subdirectories." In this example, it can be seen in information sub-panel 80 that all subdirectories below the directory "test1" have been selected. In information sub-panel 74 all the files corresponding to the highlighted subdirectory are displayed. Once again referring to sub-panel 80, it will be noted that subdirectory "test5" and "test6" are not indicated as having been selected because in accordance with the features of this invention, the user has deselected subdirectory "test5" and "test6." Thus, it can be seen by this example that the user has been provided with an extremely convenient and intuitive technique for selecting all the files in all the subdirectories hierarchically located beneath a particular directory. Further, in accordance with the advantages of this invention, the user may deselect any particular directory that is displayed graphically in user panel 80. In the example illustrations, the illustrated mode for selecting and deselecting a file is shown as "highlighting" because this is a well-known technique for graphically showing that a file has been selected or deselected. Highlighting involves providing a reverse or negative image (i.e., turning pixels off and on opposite to the normal pattern) to show that a file has been selected or deselected. However, it will be appreciated that this is merely one of many techniques that can be used to show that a file has been selected or deselected, but it is a particularly convenient one and therefore is preferred.

Figure 7:
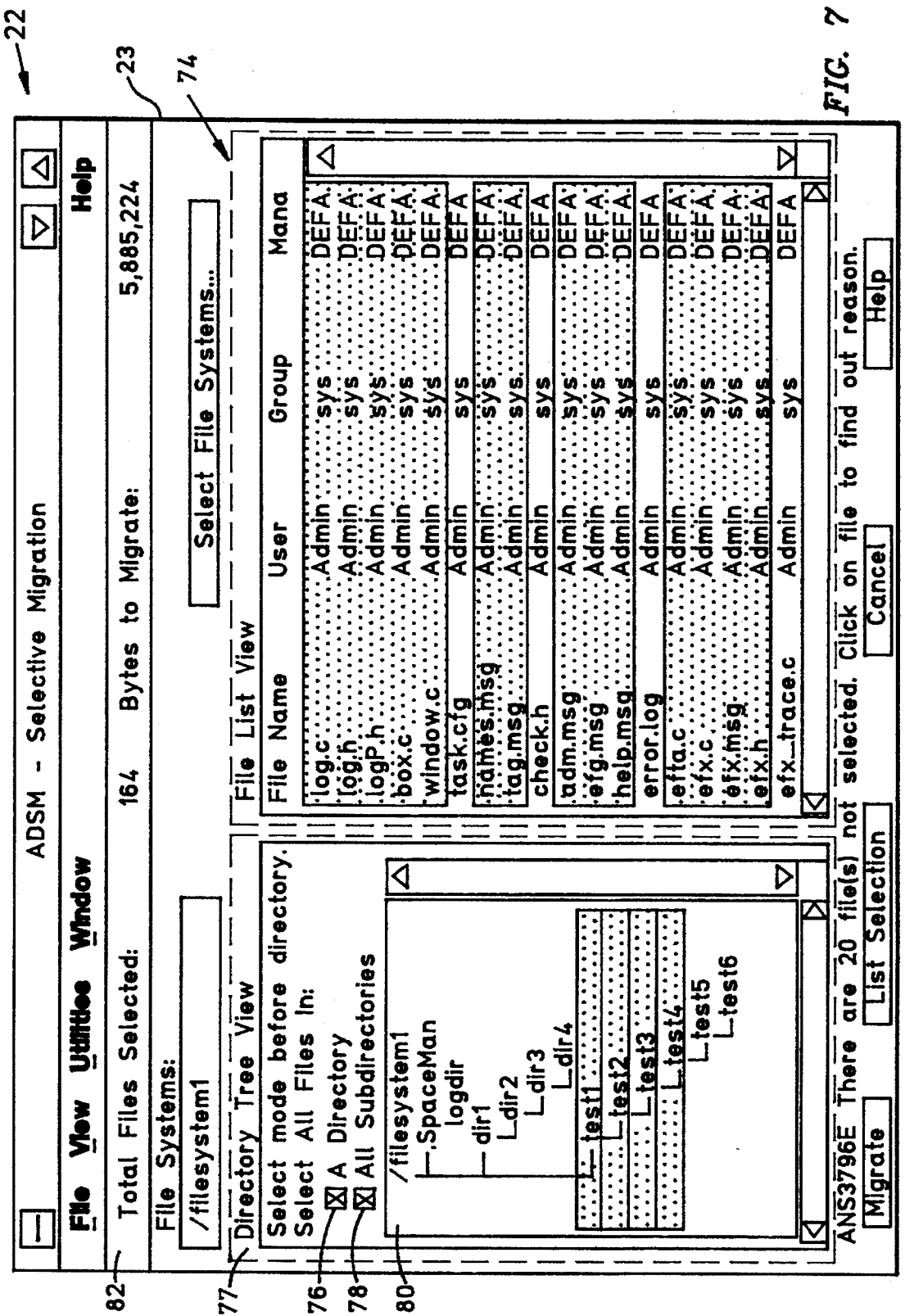

FIG. 7 shows another representation of example panel 23, described above in reference to FIGS. 5 and 6, in which the user has selected options 76 and 78 to select all files in a directory and all files in all subdirectories. The user has indicated that he wishes to select directory "test1" and has further indicated that subdirectory "test5" and "test6" are to be deselected. Of the files selected, as shown in information sub-panel 74, the following four files have been deselected or are not eligible for highlighting, "task.cfg", "check.h", "error.log", "efx_trace.c". Thus, as will be understood with reference to the detailed description of the method by which logic 26 operates, the illustrative examples in FIGS. 5, 6 and 7 show the capabilities available to the user to select and deselect directories, subdirectories and files in an extremely easy and intuitive fashion.

Operation of the Invention

FIGS. 8–14 describe the operation of this invention in flow diagram form. The following flow diagrams, when read with accompanying Tables 1–4, show the operation of the modules of logic 26 depicted in FIG. 2 for use in the data processing system of FIG. 1. Table 1, Table 2, Table 3 and Table 4 each depict a pseudocode representation of respective logic modules depicted in FIG. 2. The pseudocode is depicted in the well-known "C" language; however, it will be appreciated by those skilled in the art that such logic could be represented in another language and the logic could also be embodied as hardware in accordance with the steps shown in the flow diagrams of FIGS. 8–14.

Table 1 shown below represents the logic of the TreeSelect module. The TreeSelect function is a callback routine that is called when any one of the directories in the Directory Tree View sub-panel 77 is selected. The BuildFileList module 70 is included as a sub-part of the TreeSelect module 62. The TreeSelect module acts in response to a signal that the user has requested to select a directory by highlighting it and then sets a highlight flag to mark the file (if it is eligible for highlighting). Once a directory has been highlighted, a BuildFileList module builds a list of files and sends this to be displayed on panel 23 in the File List View window of sub-panel 74. The TreeSelect code then calls the SetupTree module (Table 2) and if a subdirectory button has been checked, then it calls the CheckAllFiles module (Table 3).

TABLE 1

TreeSelect Module

```
/*----------------------------------------------
/*Callback routine when any one of the directory in tree
/*view window is selected
/*----------------------------------------------
function TreeSelect( )
```

TABLE 1-continued

TreeSelect Module

```
    if highlight request then
        highlight directory
        set 'highlight' flag
    else
        dehighlight directory
        reset 'highlight' flag
    call BuildFileList( )   /*build list of files and display to
                            /*File List window
    SetTreeState            /*determine by current tree state,
                            /*view options, highlight/dehighlight
                            /*state. This determines the eligibility
                            /*of files to be selected or not
                            /*file eligible for highlight flag is set
if select directory button checked then
    call SetupTree( )
if select all subdirectory button checked then
    call CheckAllFiles( )
```

Table 2 shows the SetupTree module which loops through all the files in the directory and checks to see if a file is eligible. If the file is eligible the file is highlighted, a total file counter variable is incremented and the file size is added to a total file size variable. If the file is not eligible it is not selected. If this is not a highlight request and the file is currently highlighted, then the file is dehighlighted to indicate that it has not been selected. Accordingly, the total file counter is decremented and the file size is subtracted from the total size as shown in the pseudocode depicted in Table 2.

TABLE 2

SetupTree Module

```
/*----------------------------------------------------------
/*setup tree information for currently selected tree
/*----------------------------------------------------------
function SetupTree( )
    loop thru all files in directory
    {
        if highlight request then
        {
            if file is eligible for highlight
            {
                highlight file
                increment 'total file' counter
                add file size to 'total size'
            }
        }
        else
        {
            if file is highlighted
            {
                dehighlight file
                decrement 'total file' counter
                subtract file size from 'total size'
            }
        }
    }
}
```

Table 3 shows the pseudocode of the CheckAllFiles module which loops through all child directories in the current directory (i.e., all subdirectories). For each child directory the UpdateFiles module (Table 4) is called and the CheckAllFiles module is called recursively by itself.

TABLE 3

CheckAllFiles Module

```
/*----------------------------------------------------------
/*setup tree information for subdirectories
/*----------------------------------------------------------
function CheckAllFiles( )
    loop thru all child directories in current directory
    {
        call UpdateFiles( ) for child directory
        call CheckAllFiles( ) for child directory
    }
```

Table 4 shows the UpdateFiles code which is called by the CheckAllFiles module. In the UpdateFiles module all files in the directory are looped through to determine if there is a highlight request for a particular file, and if the file is eligible for highlighting. If both of these conditions are met, then the total file counter variable and the file size variable are incremented. Otherwise, if the file is highlighted then dehighlight file and the total file counter variable is decremented and the file size is subtracted from the total size variable.

TABLE 4

UpdateFiles Module

```
/*----------------------------------------------------------
/* mark files as selected/unselected in directory
/*----------------------------------------------------------
function UpdateFiles( )
    loop thru all files in directory
    {
        if highlight request then
        {
            if file is eligible for highlight then
            {
                highlight file
                increment 'total file' counter
                add file size to 'total size'
            }
        }
        else
        {
            if file is highlighted
            {
                dehighlight file
                decrement 'total file' counter
                subtract file size from 'total size'
            }
        }
    }
```

Figure 8:
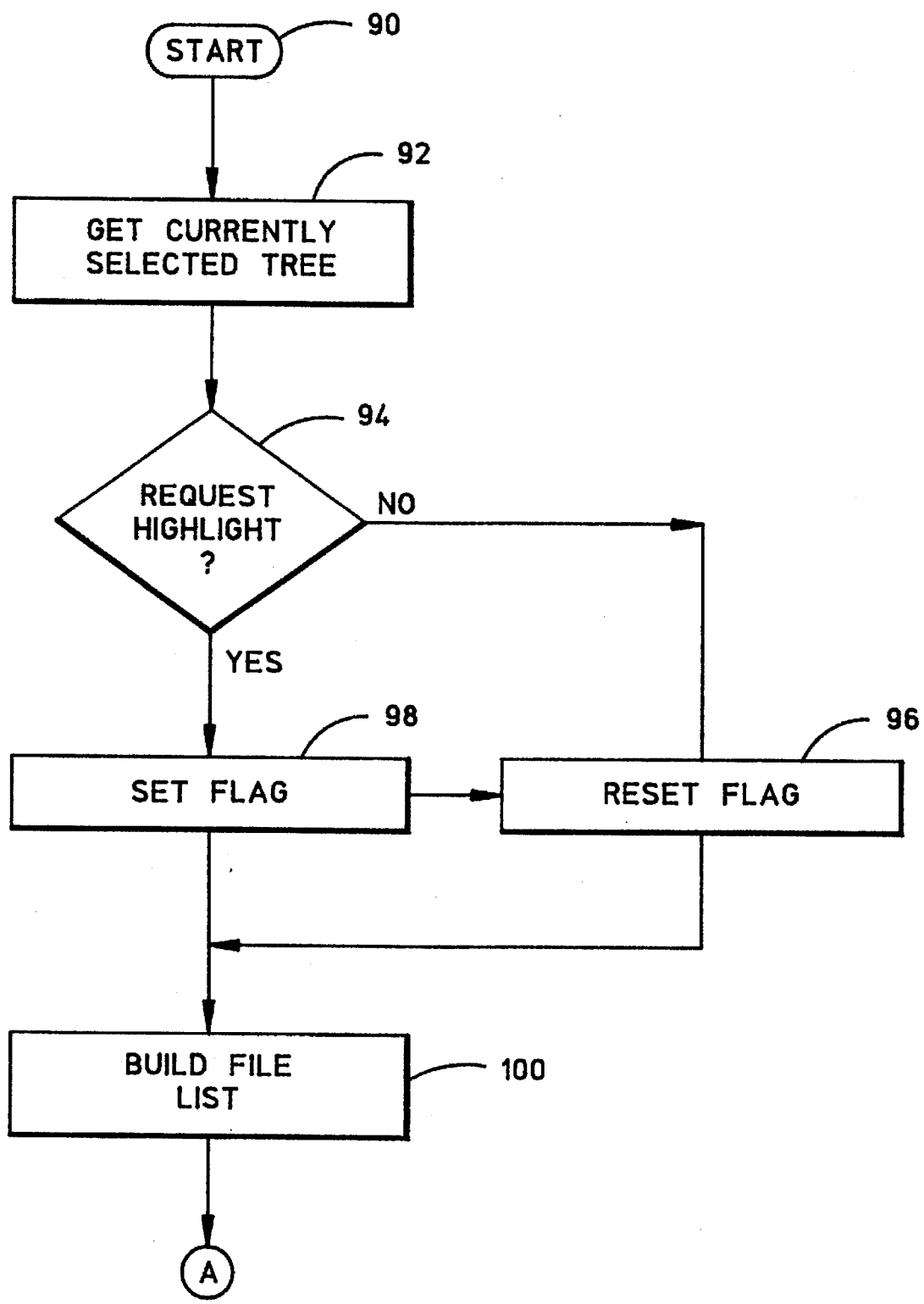
FIGS. 8, 9, 10, 11, 12, 13 and 14 are each flow charts showing the operational sequence of the method of this invention carried out in the data processing system of FIG. 1.

FIGS. 8–14 show the implementation of each of these logic modules described above. Referring to FIG. 8, the operation of the invention is started in step 90 when the user selects a user option data object, such as icon 76 or 78, that represents a user. Henceforth, for simplicity sake, reference to "Selecting an option" will be used to refer to the action of manipulating the data object presented on the screen to represent such an option to select all files in a directory or all subdirectories. The description of the operation of the invention assumes that the panel 23 has been provided to the user; however, it will be appreciated that providing the panel to the user is a critical step and therefore is a fundamental part of this invention. The panel is created by GUI logic 26, preferably according to protocol standards established through the Motif API. In response to a user's selection of either a directory or subdirectory, in step 92, logic 26 determines the hierarchical tree that has been selected. If there is a request to select, i.e. highlight, a particular subdirectory within the tree a highlight flag is set in step 98. If the response to step 94's inquiry is "no" then the highlight flag is reset to a non-highlight state, in step 96. In step 100, a file list is built in accordance with all the files that have been selected in the currently selected tree. Connecting step "A" connects up with the steps of the method shown in FIG. 9.

Figure 9:
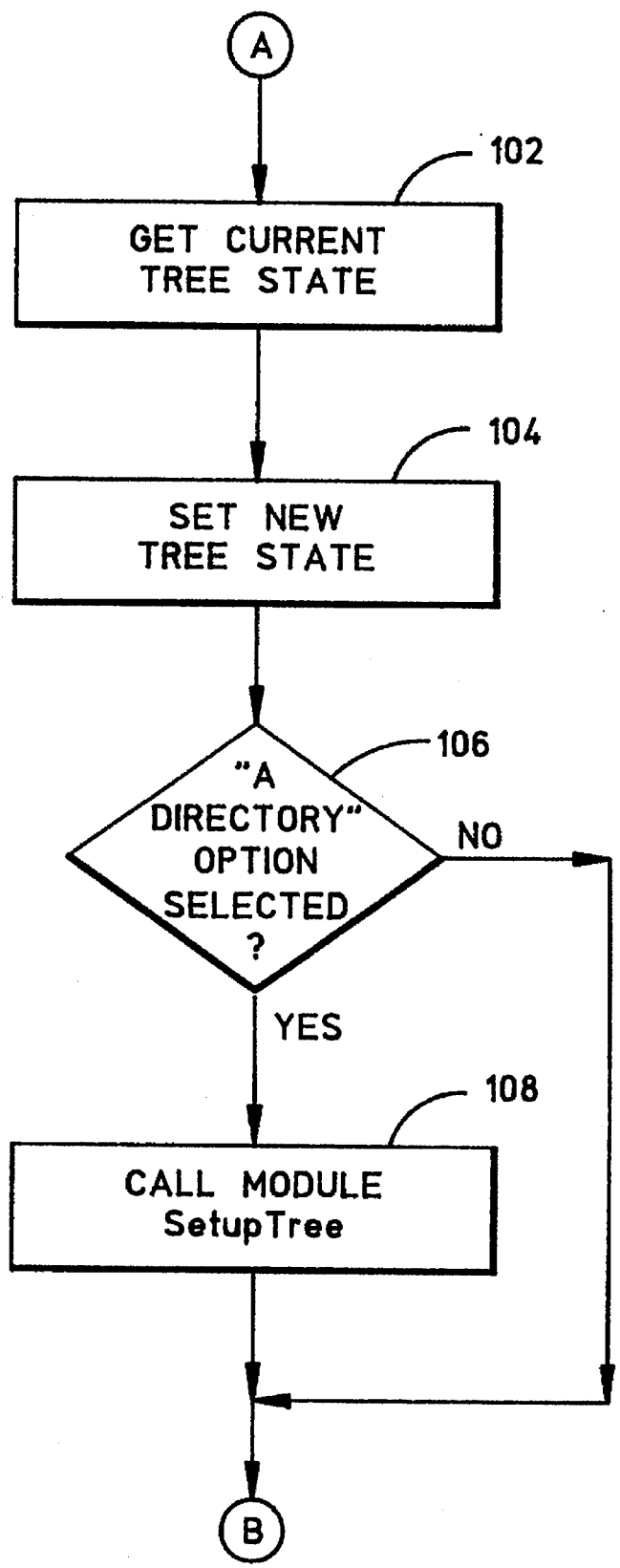

FIG. 9 depicts further steps in the operation of this invention. The current "tree state" is retrieved in step 102. The tree state is a shorthand notation for the "state" of each file in the selected tree. State refers to whether a file is highlighted or dehighlighted. In step 104 a new tree state is set. If it is determined that the "A Directory" option is selected to reflect eligibility of files, i.e. some file states originally changed to "highlight" may need to be changed because the file is ineligible, in step 106, the SetupTree module is called in step 108. If not, then the SetupTree module is not called. Connecting step B is shown to indicate that the steps of this invention continue in FIG. 10.

Figure 10:
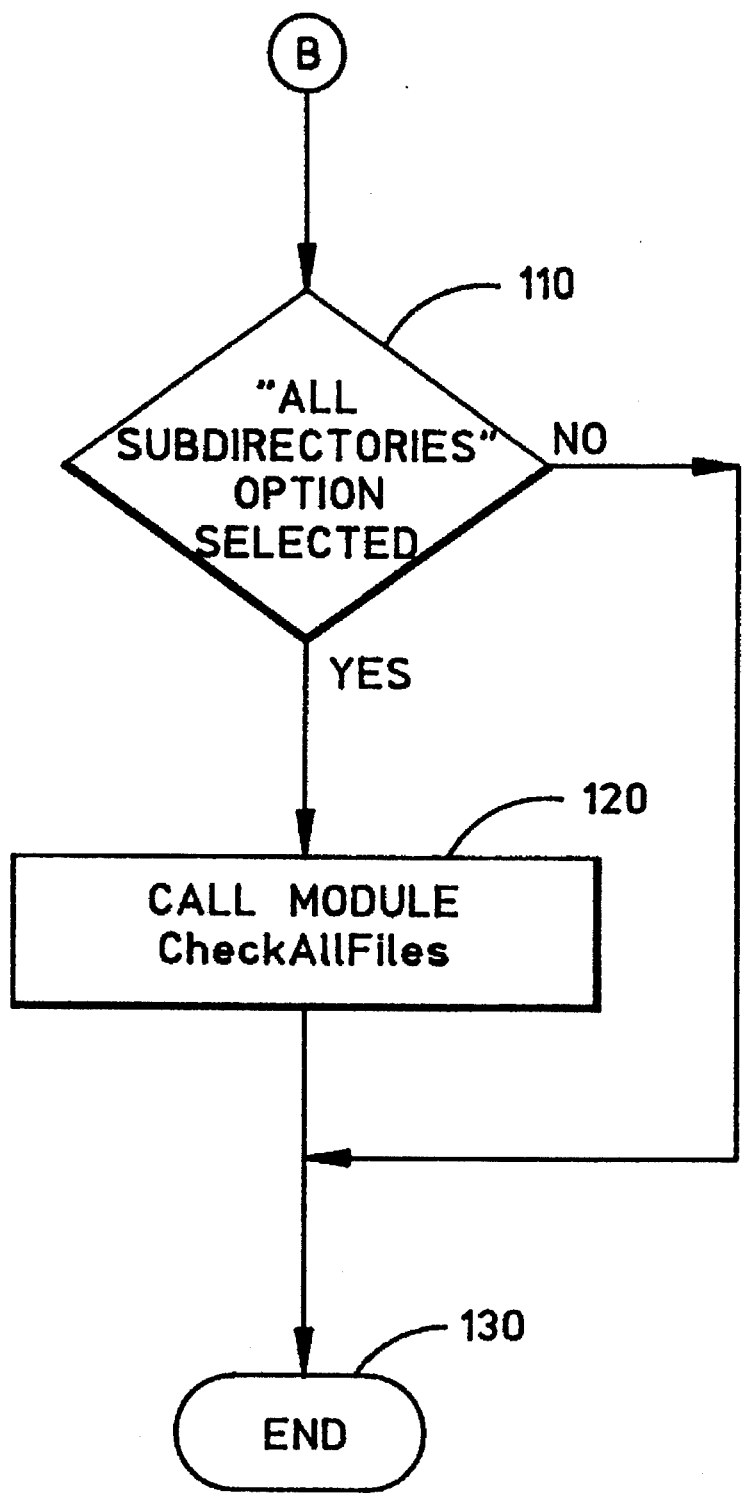

In FIG. 10, following connecting step B, an inquiry is posed to see if the "All Subdirectories" option has been selected, in step 110. If the answer is "no" then the process ends in step 130. If, however, the answer is "yes" then the CheckAllFiles module is called in step 120.

Figure 11:
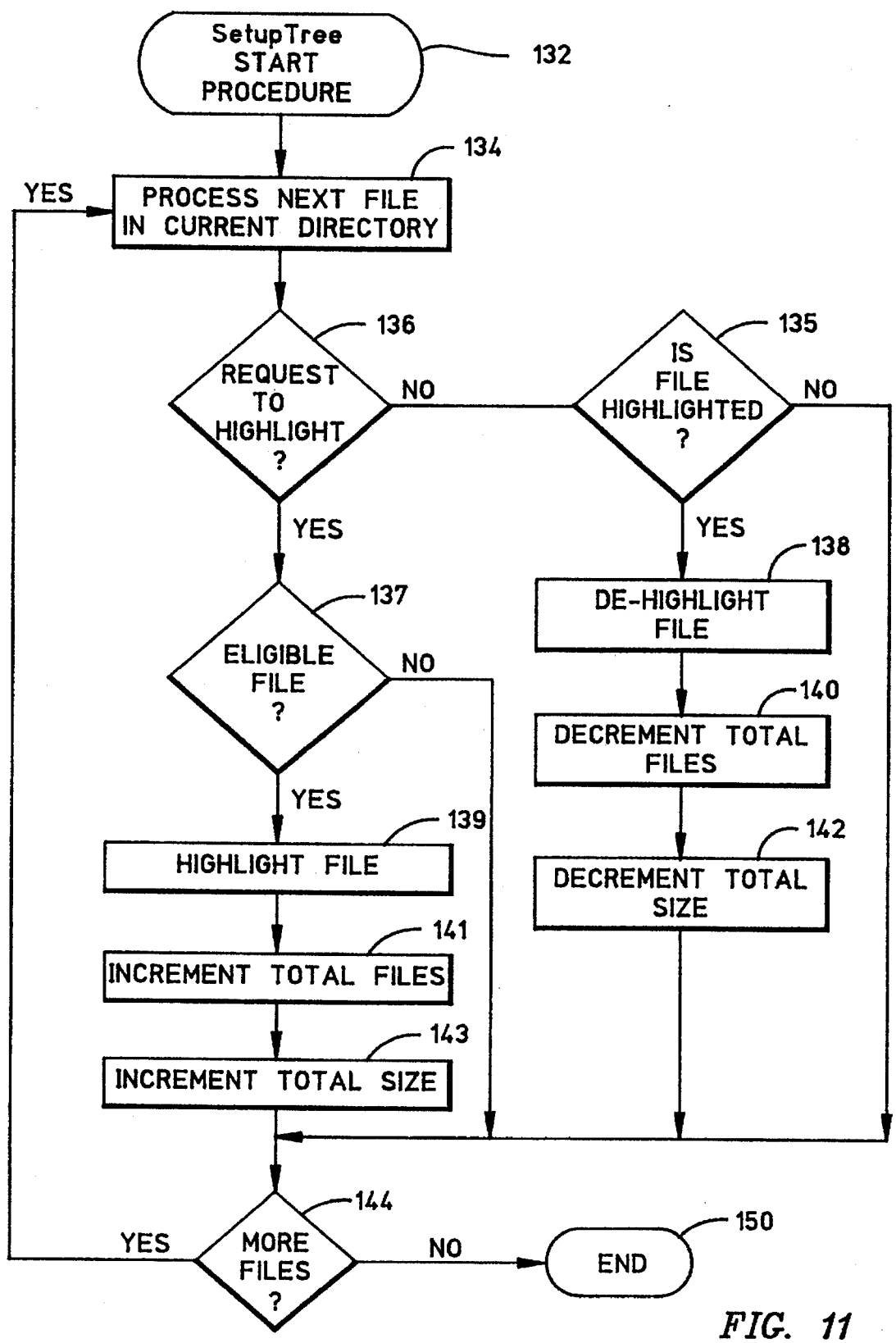

FIG. 11 illustrates the SetupTree module operation. Once the SetupTree module is called in step 132 the next file in the current directory is processed. An inquiry is posed in step 136 to determine if this is a request to highlight or select the file that is being processed. If the answer to the inquiry in step 136 is "no" another test is performed in step 135. In step 135, an inquiry is posed to determine if file is currently highlighted. If so, then in step 138 the file is dehighlighted. If not, then processing flows to step 144, discussed below. Following step 138, the total files variable is decremented in step 140 and the total size is decremented in accordance with the logic depicted in Table 2. If, however, the answer to the inquiry in step 136 is "yes" and the answer to the inquiry in step 137 is "yes", i.e. is this an eligible file, then the file is highlighted in step 139. The total files variable is incremented in step 141, and the total size is incremented in step 143. In step 144 an inquiry is posed to determine if there are more files in the current directory. If the answer is "yes" then processing loops back to step 134 and steps 136-143 are re-processed until the answer to the inquiry in step 144 is "no" and then processing ends in step 150.

Figure 12:
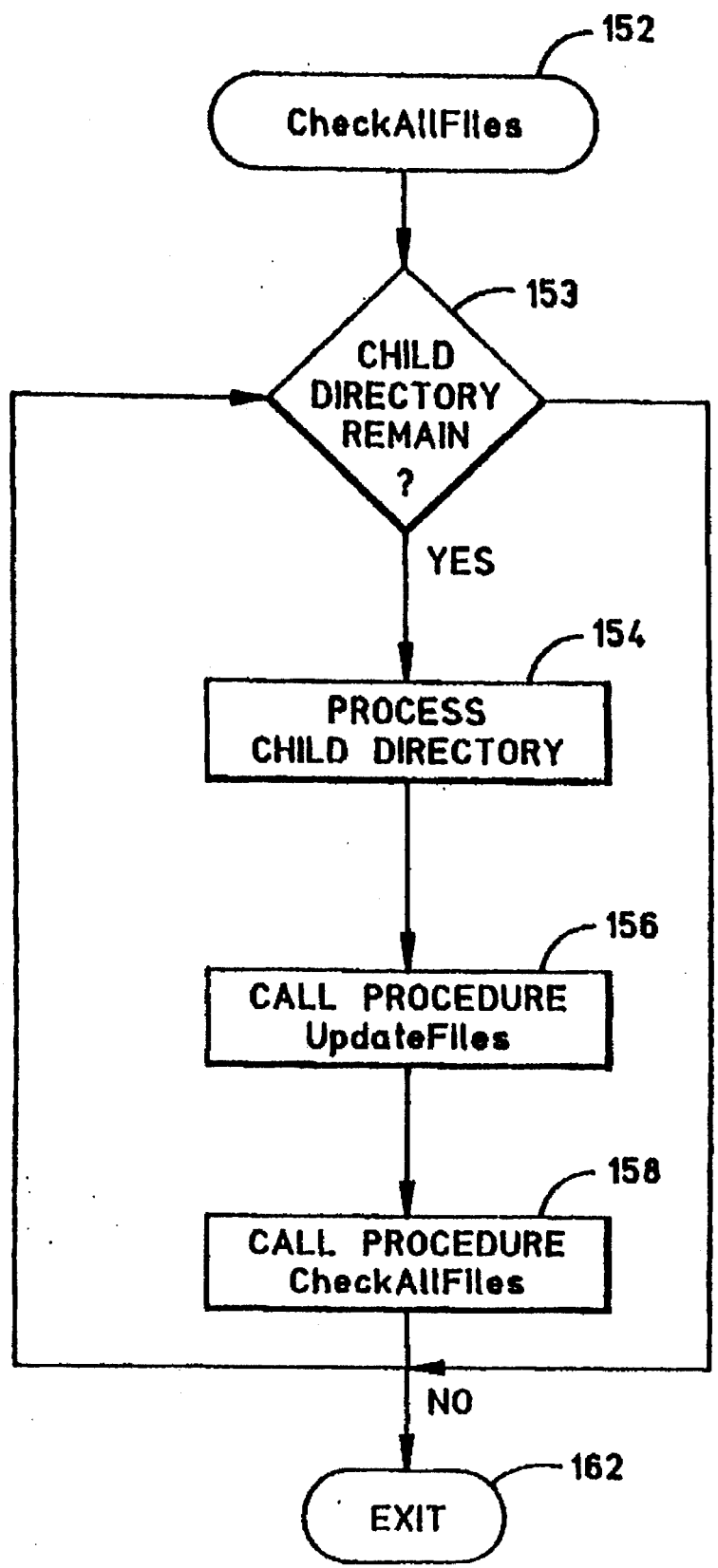

FIG. 12 shows the steps performed when the CheckAll-Files module (pseudocode shown in Table 3) is called in step 152. In step 153, an inquiry determines if any child directories remain. If not, then processing is exited in step 162. The next child directory, i.e. subdirectory, is processed according to step 154, if the answer to the inquiry is "yes". In step 156 the UpdateFiles procedure is called. Following this, in step 158, the procedure CheckAllFiles is called in recursive fashion by the CheckAllFiles module. This is done in order to process all child directories before processing the next "sibling" directory. The term "sibling" refers to a node having the same immediate parent. For example, with reference to FIG. 3, subdirectory 38 is a sibling to subdirectory 39 (their parent is subdirectory 34). Subdirectory 38 has two children subdirectories 50 and 52. Steps 153-158 are repeated until no child directories remain. Once none remain, the CheckAllFiles module is exited as shown in step 162.

Figure 13:
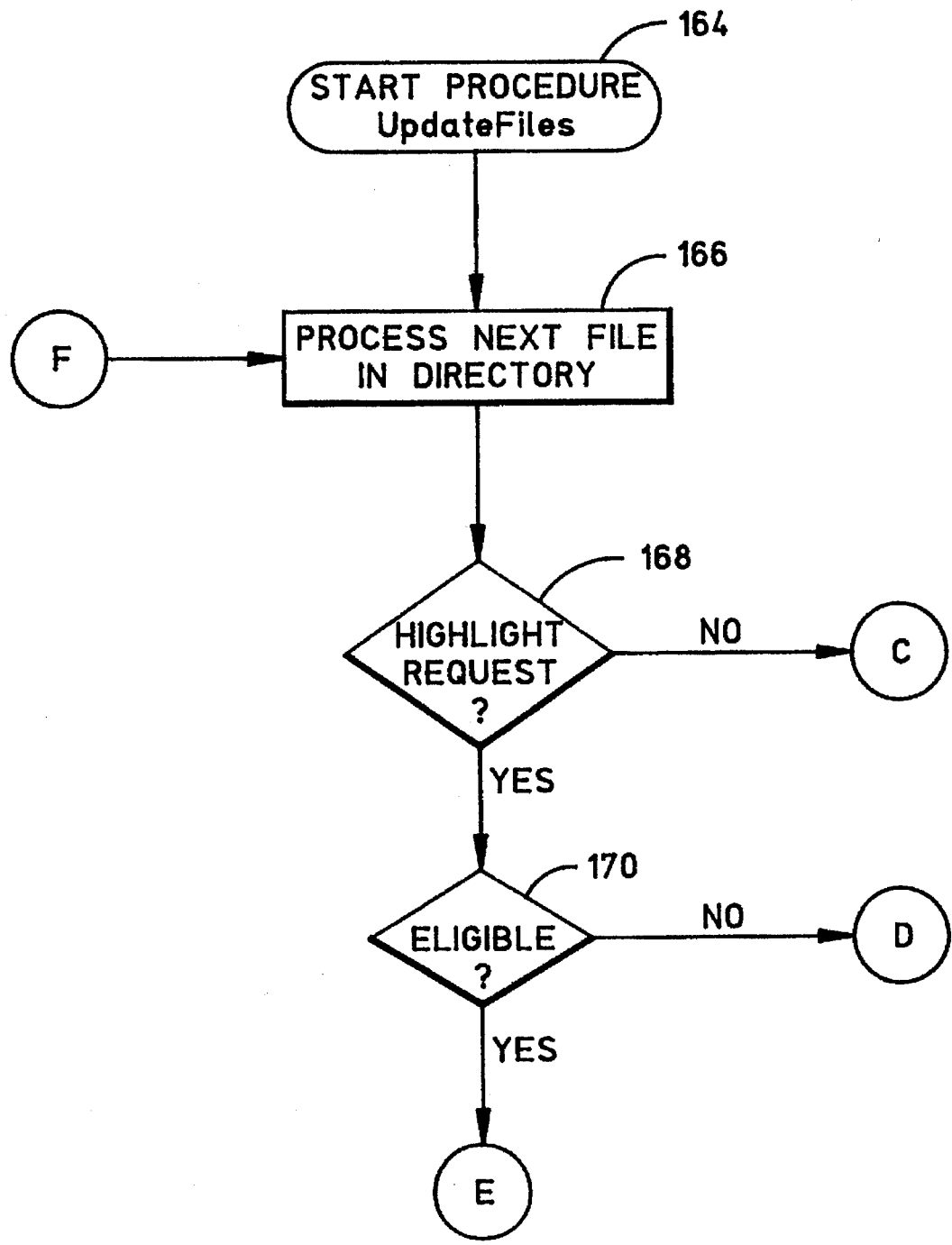

FIG. 13 shows the operation of the UpdateFiles module described above with reference to Table 4. Once the Update-Files module is called in step 164 then the next file in the directory is processed in step 166. If this is a request to highlight a file in step 168, then processing flows to step 170 to check to see if the file is eligible for highlighting. If this is not a request for highlighting then processing continues to step C, and if this is a request for highlighting and the file is eligible then processing continues to step E. However, if the file is not eligible then processing continues to step D. FIG. 13 also shows that step F flows into the processing next file and directory and this will be explained with reference to FIG. 14 below.

Figure 14:
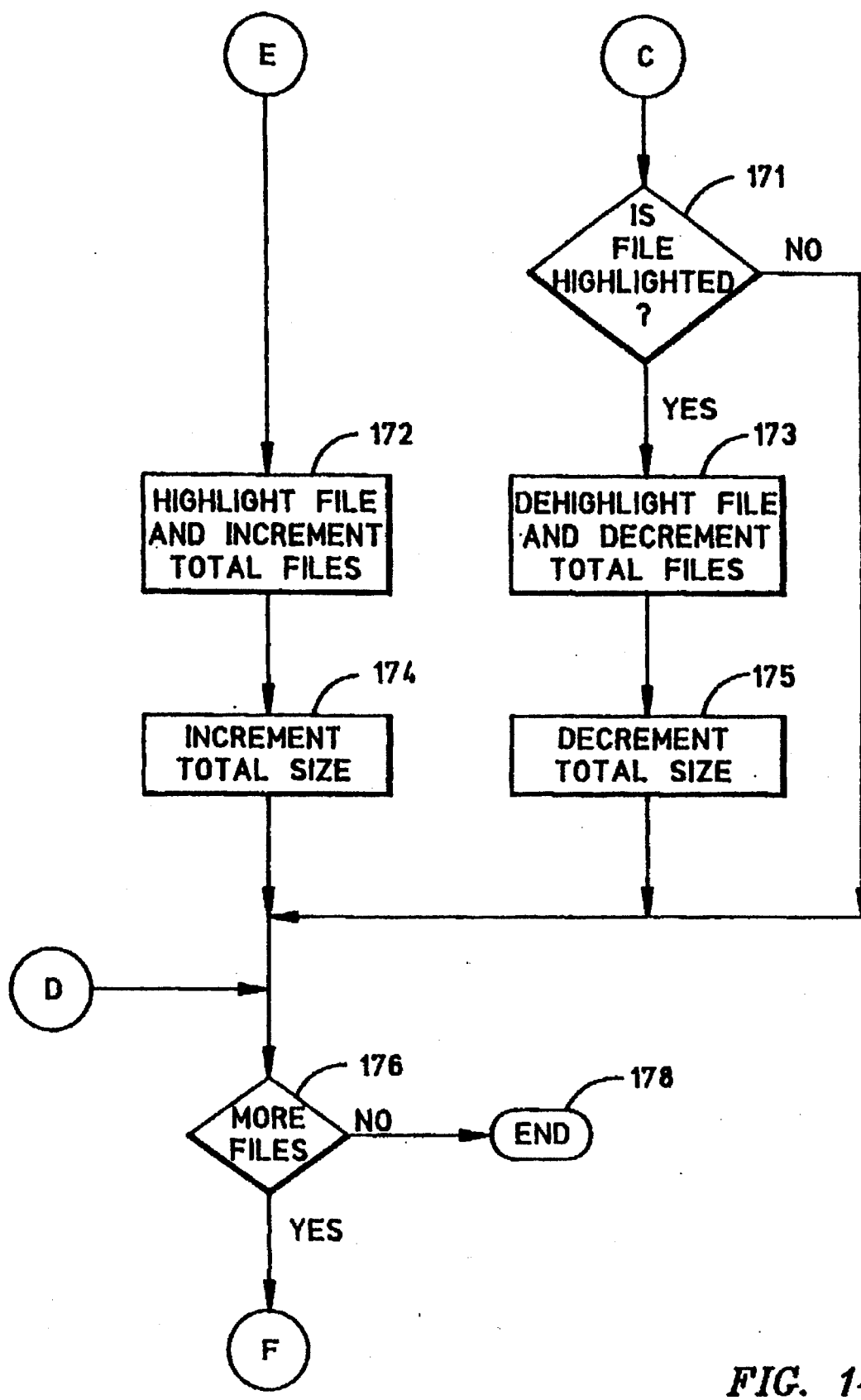

FIG. 14 depicts the remaining steps in the UpdateFiles process. Following step E, the file is highlighted and the total files variable is incrementally increased in step 172 and the total size variable is incrementally increased in step 174. Following step C, step 171 determines if the file is currently highlighted. (Recall step C represents a situation when there is not a request to highlight, as described with reference to step 168 of FIG. 13 above). If so, step 173 dehighlights the file and decrements the total files variable and step 175 decrements the total size variable. If not, processing flows to step 176. Following step E-initialized path or the step C-initialized path, processing also flows to step 176 in which case an inquiry is posed. An inquiry is performed in step 176 to determine if there are more files. If the answer is "yes", then processing flows into step F. Step F connects back with step 166 of FIG. 13 and the next file in the directory is processed and steps 166-175 are selectively enacted as described above. If the answer to the inquiry posed in step 170 (FIG. 14) is "no", then neither the step E-initialized or step C-initialized path is followed and processing flows directly into step 176. If there are no more files processing ends in step 178.

Figure 15:
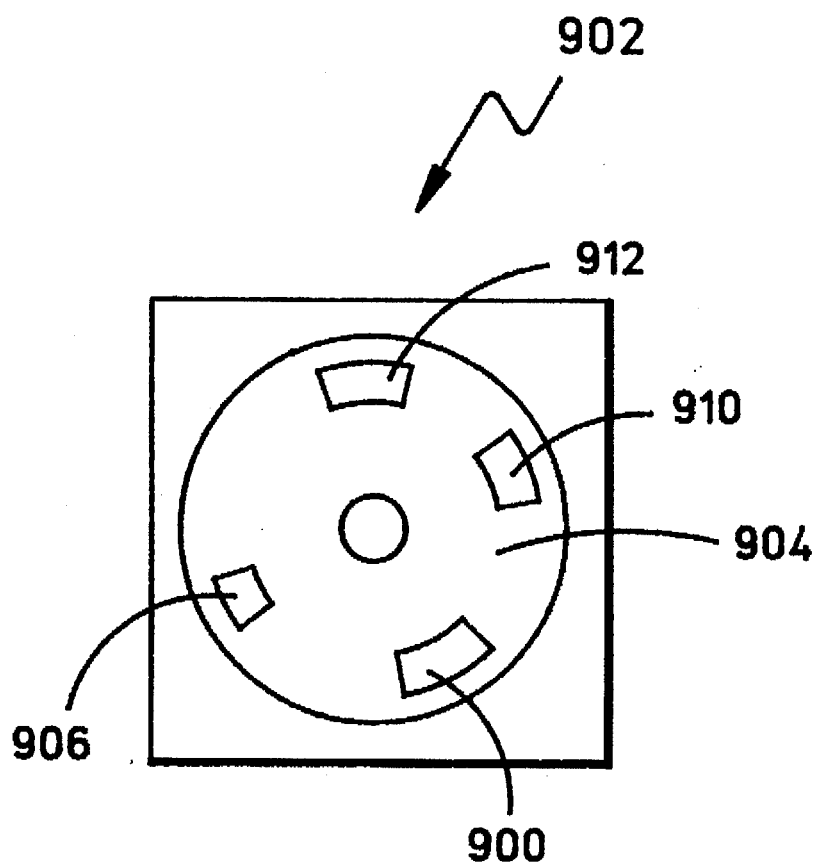
FIG. 15 is an article of manufacture, such as pre-recorded floppy disk, or other similar computer program product, for use with the data processing system of FIG. 1 with program means recorded thereon for directing the data processing system to facilitate the practice of the method of this invention as shown in flow charts in FIGS. 8–14.

While this invention is primarily discussed as a method, it can be understood by a person of ordinary skill in the art that the apparatus discussed above in connection with FIGS. 1 and 2 may be programmed or otherwise designed to facilitate the practice of the method of this invention. Also, an article of manufacture such as a pre-recorded floppy disk 902 in FIG. 15, or other similar computer program product for use with a data processing system, such as the data processing system of FIG. 1, could include a storage medium such as magnetic storage medium 904 and program means recorded thereon, such as program means 906, 908, 910 and 912 and FIG. 15, for directing the data processing system to facilitate the practice of the method of this invention. It will be understood that such apparatus and articles of manufacture also fall within the spirit and scope of this invention.

Other embodiments and modifications of this invention may occur to those of ordinary skill in the art in view of these teachings. Therefore, this invention is limited only by the following claims, which include all such embodiments and modifications when viewed in conjunction with the above specification and accompanying drawing.

What is claimed is:

1. In a computer system having a display with a screen and a graphical user interface, and further having memory coupled to the display, a method for allowing a user to select for an operation any component within a hierarchical file tree structure, the method comprising the unordered machine-executed steps of:

responsive to a user specifying a directory, displaying data objects representing a tree structure of subdirectories located below the user specified directory;

displaying a user option object on the screen that represents a user option to select for an operation specified components of the file tree structure, the user option object being different from filenames, directory names, and subdirectory names; and responsive to a user selecting the user option object on the screen and marking a starting directory within the displayed tree structure as being the starting point for selection, selecting for an operation the components of the file tree structure specified by the selection of the user option object.

2. The method of claim 1, wherein there are at least two user option objects displayed on the screen and a first option object of the at least two user option objects represents a user option to command the system to select for an operation all files in the user specified starting directory.

3. The method of claim 1, wherein the user may specify that a subdirectory located hierarchically below the user specified starting directory is not to be selected for an operation by using an input device to mark a subdirectory data object displayed on the screen and representing the subdirectory not to be selected.

4. The method of claim 2, and further including the machine-executed step of displaying a corresponding file object for each file that is selected in response to a user selecting the first option object or the second option object.

5. The method of claim 2, wherein a second option of the at least two options displayed on the screen represents an option to command the system to select for an operation all files in all subdirectories hierarchically located below the user specified starting directory marked in the hierarchical tree structure.

6. The method of claim 5, wherein the system is adapted to not select any component of the tree structure if it does not meet a predefined criteria for eligibility for being selected.

7. The method of claim 5, wherein the first option and the second option can be performed at substantially the same time in response to a user selection of the first option object together with the second option object.

8. The method of claim 4, wherein the user may specify that a file is not to be selected for an operation by the system by using an input device to mark a file data object displayed on the screen that represents the file not to be selected.

9. A computer system for allowing a user to select for an operation any component within a hierarchical file tree structure, the system comprising:

a processor;

memory coupled to the processor;

a display coupled to the memory, the display having a screen;

graphical interface logic being loaded into the memory for providing a graphical user interface on the display screen; and the graphical interface logic having machine-executed means coupled to the processor for displaying, on the screen, one or more data objects related to components within a hierarchical file tree structure on the screen, by:

responsive to a user specifying a directory, displaying data objects representing a tree structure of subdirectories located below the user specified directory;

displaying a user option object on the screen that represents a user option to select for an operation specified components of the file tree structure, the user option object being different from filenames, directory names, and subdirectory names; and responsive to a user selecting the user option object on the screen and marking a starting directory within the displayed tree structure as being the starting point for selection, selecting for an operation the components of the file tree structure specified by the selection of the user option object.

10. The system of claim 9, wherein there are at least two user option objects displayed on the screen and a first option object of the at least two user option objects represents a user option to command the system to select for an operation all files in the user specified starting directory.

11. The system of claim 10, wherein a second option of the at least two options displayed on the screen represents an option to command the system to select for an operation all files in all subdirectories hierarchically located below the user specified starting directory marked in the hierarchical tree structure.

12. The system of claim 10, and further including the machine-executed step of displaying a corresponding file object for each file that is selected in response to a user selecting the first option object or the second option object.

13. The system of claim 11, wherein the first option and the second option can be performed at substantially the same time in response to a user selection of the first option object together with the second option object.

14. A computer program product for use in a computer system having a display with a screen and a graphical user interface, and further having memory coupled to the display, the program product being adapted for allowing a user to select for an operation any component within a hierarchical file tree structure, the computer program product comprising:

a recording medium;

means, recorded on the recording medium, for being responsive to a user's action of specifying a directory by displaying data objects representing a tree structure of subdirectories that are hierarchically located in the file tree structure below the user specified directory;

means, recorded on the recording medium, for displaying a user option object on the screen that represents a user option to select for an operation specified components of the file tree structure, the user option object being different from filenames, directory names, and subdirectory names; and means, recorded on the recording medium, for being responsive to a user's action of selecting the user option object on the screen and the user's action of marking a starting directory within the displayed tree structure as being the starting point for selection by selecting for an operation the components of the file tree structure specified by the selection of the user option object.

15. The computer program product of claim 14, including means, recorded on the medium, for displaying at least two user option objects on the screen and a first option object of the at least two user option objects represents a user option to command the system to select for an operation all files in the user specified starting directory.

16. The computer program product of claim 15, wherein a second option of the at least two options displayed on the screen represents an option to command the system to select for an operation all files in all subdirectories hierarchically located below the user specified starting directory marked in the hierarchical tree structure.

17. The computer program product of claim 15, and further including the means, recorded on the medium, for displaying a corresponding file object for each file that is selected in response to a user selecting the first option object or the second option object.

18. The computer program product of claim 16, wherein the first option and the second option can be performed at substantially the same time in response to a user selection of the first option object together with the second option object.

19. An apparatus for allowing a user to select for an operation any component within a hierarchical file tree structure, the apparatus comprising:

a processor;

memory coupled to the processor;

a display coupled to the memory, the display having a screen;

graphical user interface logic being loaded into the memory for providing a graphical user interface on the display screen; and the graphical user interface logic further including:

a first module responsive to a user specifying a directory by displaying data objects representing a tree structure of subdirectories located below a user specified directory;

a second module for displaying a user option object on the screen that represents a user option to select for an operation specified components of the file tree structure, the user option object being different from filenames, directory names, and subdirectory names; and a third module responsive to a user selecting the user option object on the screen and marking a starting directory within the displayed tree structure as being the starting point for selection, selecting for an operation the components of the file tree structure specified by the selection of the user option object.

20. In a computer system having a display with a screen and a graphical user interface, and further having memory coupled to the display, a method for allowing a user to select for an operation any component within a hierarchical file tree structure, the method comprising the unordered machine-executed steps of:

responsive to a user specifying a directory, displaying data objects representing a tree structure of subdirectories located below the user specified directory;

displaying a user option object on the screen that represents a user option to select for an operation specified components of the file tree structure;

responsive to a user selecting the user option object on the screen and marking a starting directory within the displayed tree structure as being the starting point for selection, selecting for an operation the components of the file tree structure specified by the selection of the user option object; and deselecting one of the selected components of the file tree structure specified by the selection of the user option object.

21. The method of claim 20, wherein there are at least two user option objects displayed on the screen and a first option object of the at least two user option objects represents a user option to command the system to select for an operation all files in the user specified starting directory.

22. The method of claim 20, wherein the user may specify that a subdirectory located hierarchically below the user specified starting directory is not to be selected for an operation by using an input device to mark a subdirectory data object displayed on the screen and representing the subdirectory not to be selected.

23. The method of claim 21, and further including the machine-executed step of displaying a corresponding file object for each file that is selected in response to a user selecting the first option object or the second option object.

24. The method of claim 21, wherein a second option of the at least two options displayed on the screen represents an option to command the system to select for an operation all files in all subdirectories hierarchically located below the user specified starting directory marked in the hierarchical tree structure.

25. The method of claim 24, wherein the system is adapted to not select any component of the tree structure if it does not meet a predefined criteria for eligibility for being selected.

26. The method of claim 24, wherein the first option and the second option can be performed at substantially the same time in response to a user selection of the first option object together with the second option object.

27. The method of claim 23, wherein the user may specify that a file is not to be selected for an operation by the system by using an input device to mark a file data object displayed on the screen that represents the file not to be selected.

28. A computer system for allowing a user to select for an operation any component within a hierarchical file tree structure, the system comprising:

a processor;

memory coupled to the processor;

a display coupled to the memory, the display having a screen;

graphical interface logic being loaded into the memory for providing a graphical user interface on the display screen; and the graphical interface logic having machine-executed means coupled to the processor for displaying, on the screen, one or more data objects related to components within a hierarchical file three structure on the screen, by:

responsive to a user specifying a directory, displaying data objects representing a tree structure of subdirectories located below the user specified directory;

displaying a user option object on the screen that represents a user option to select for an operation specified components of the file tree structure;

responsive to a user selecting the user option object on the screen and marking a starting directory within the displayed tree structure as being the starting point for selection, selecting for an operation the components of the file tree structure specified by the selection of the user option object; and deselecting one of the selected components of the file tree structure specified by the selection of the user option object.

29. The system of claim 28, wherein there are at least two user option objects displayed on the screen and a first option object of the at least two user option objects represents a user option to command the system to select for an operation all files in the user specified starting directory.

30. The system of claim 29, wherein a second option of the at least two options displayed on the screen represents an option to command the system to select for an operation all files in all subdirectories hierarchically located below the user specified starting directory marked in the hierarchical tree structure.

31. The system of claim 29, and further including the machine-executed step of displaying a corresponding file object for each file that is selected in response to a user selecting the first option object or the second option object.

32. The system of claim 30, wherein the first option and the second option can be performed at substantially the same time in response to a user selection of the first option object together with the second option object.

33. A computer program product for use in a computer system having a display with a screen and a graphical user interface, and further having memory coupled to the display, the program product being adapted for allowing a user to select for an operation any component within a hierarchical file tree structure, the computer program product comprising:

a recording medium;

means, recorded on the recording medium, for being responsive to a user's action of specifying a directory by displaying data objects representing a tree structure of subdirectories that are hierarchically located in the file tree structure below the user specified directory;

means, recorded on the recording medium, for displaying a user option object on the screen that represents a user option to select for an operation specified components of the file tree structure;

means, recorded on the recording medium, for being responsive to a user's action of selecting the user option object on the screen and the user's action of marking a starting directory within the displayed tree structure as being the starting point for selection by selecting for an operation the components of the file tree structure specified by the selection of the user option object; and means, recorded on the recording medium, for deselecting one of the selected components of the file tree structure specified by the selection of the user option object.

34. The computer program product of claim 33, including means, recorded on the medium, for displaying at least two user option objects on the screen and a first option object of the at least two user option objects represents a user option to command the system to select for an operation all files in the user specified starting directory.

35. The computer program product of claim 34, wherein a second option of the at least two options displayed on the screen represents an option to command the system to select for an operation all files in all subdirectories hierarchically located below the user specified starting directory marked in the hierarchical tree structure.

36. The computer program product of claim 34, and further including the means, recorded on the medium, for displaying a corresponding file object for each file that is selected in response to a user selecting the first option object or the second option object.

37. The computer program product of claim 35, wherein the first option and the second option can be performed at substantially the same time in response to a user selection of the first option object together with the second option object.

38. An apparatus for allowing a user to select for an operation any component within a hierarchical file tree structure, the apparatus comprising:

a processor;

memory coupled to the processor;

a display coupled to the memory, the display having a screen;

graphical user interface logic being loaded into the memory for providing a graphical user interface on the display screen; and the graphical user interface logic further including:

a first module responsive to a user specifying a directory by displaying data objects representing a tree structure of subdirectories located below a user specified directory;

a second module for displaying a user option object on the screen that represents a user option to select for an operation specified components of the file tree structure; and a third module responsive to a user selecting the user option object on the screen and marking a starting directory within the displayed tree structure as being the starting point for selection, selecting for an operation the components of the file tree structure specified by the selection of the user option object; and a fourth module responsive to a user for deselecting one of the selected components of the file tree structure specified by the selection of the user option object.

* * * * *

UNITED STATES PATENT AND TRADEMARK OFFICE
CERTIFICATE OF CORRECTION

PATENT NO. : 5,644,736
DATED : July 1, 1997
INVENTOR(S) : Healy et al

It is certified that error appears in the above-indentified patent and that said Letters Patent is hereby corrected as shown below:

On the Title page, item [56]:

Please change 5,218,696 "Band et al." to --Baird et al.--.

Signed and Sealed this

Twenty-second Day of December, 1998

Attest:

BRUCE LEHMAN

Attesting Officer

Commissioner of Patents and Trademarks